United States Patent [19]

Lawrence

[11] Patent Number: 5,253,823
[45] Date of Patent: Oct. 19, 1993

[54] GUIDANCE PROCESSOR

[75] Inventor: Richard V. Lawrence, Blackwater, England

[73] Assignee: The Secretary of State for Defence in Her Britannic Majesty's Government of the United Kingdom of Great Britain and Northern Ireland, London, England

[21] Appl. No.: 662,981

[22] Filed: Sep. 26, 1984

[30] Foreign Application Priority Data

Oct. 7, 1983 [GB] United Kingdom ............... 8326848

[51] Int. Cl.$^5$ .............................................. F41G 7/00
[52] U.S. Cl. ............................................... 244/3.15
[58] Field of Search ...................... 244/3.15, 3.16, 3.19

[56] References Cited

U.S. PATENT DOCUMENTS

| 4,396,878 | 8/1983 | Cole et al. | 244/3.15 |
| 4,492,352 | 1/1985 | Yueh | 244/3.15 |
| 4,494,202 | 1/1985 | Yueh | 244/3.15 |
| 4,502,650 | 3/1985 | Yueh | 244/3.15 |
| 4,508,293 | 4/1985 | Jones | 244/3.15 |

FOREIGN PATENT DOCUMENTS 1441127 6/1976 United Kingdom .

Primary Examiner—Charles T. Jordan
Attorney, Agent, or Firm—Nixon & Vanderhye

[57] ABSTRACT

The invention relates to a guidance processor for a homing missile having a strapdown seeker providing sight line look angle measurements with respect to missile body axes and includes means for receiving sight line look angle measurements, and means for transforming the look angle measurements from missile body axes to pseudo measurements in a further set of axes defined to force the pseudo measurements to be small.

6 Claims, 2 Drawing Sheets

GUIDANCE PROCESSOR

This invention relates to missile guidance and in particular to guidance processors for homing missiles intended to collide with a moving target.

The classical solution to the missile guidance problem is based on measurement of sight line spin (that is the rotation of a line projected from missile to target) and implementation of guidance laws to provide a collision based on sight line spin measurements. The missile is steered to a collison course by causing it to make accelerative manoeuvres in axes normal to the sight line proportional to the rates of turn of the sight line in these axes. Unfortunately the problem of estimating sight line spin is a very difficult one because the sensors employed in the missile to measure the orientation of the sight line are subjected to the violent angular motion of the missile as it manoeuvres onto the collision course.

In the past, a preferred method of measuring sight line spin has been to employ a gimballed dish assembly in the nose of the missile, upon which are mounted angle sensing devices (such as radar, infra-red, or other sensors) which measure the angles between the dish boresight and the sight line in two planes. The measurements are used to drive servo motors which correct the angular errors and drive the dish boresight onto the sight line. Provided the dish servos are of wide enough bandwidth and have sufficiently high gain, the dish will be locked to the sight line and thus effectively decoupled from the missile body and its violent angular motion. The sight line spin rate estimates in each plane of the dish gimbal assembly are then established by mounting rate gyroscopes on the dish. Provided the dish accurately tracks the sight line, the rate gyro outputs will be good estimates of the components of sight line spin rate. In the prior art, the rate gyros are also used to stabilise the dish servos by employing their outputs in a feedback fashion within the control loops. Furthermore, if the target tracking signal is lost, the rate gyros stabilise the dish orientation in the x, y, z space via the dish servos, against any angular motion of the missile body.

The gimballed dish solution to the sight line spin estimation problem, and its many derivatives and refinements, have served very well in previous generation missile systems. However, the increasing requirements for missile agility, accuracy and rapid response time, and the high precision and hence high cost of mechanical gimbal/gyro/homing sensor assemblies, are all factors which are forcing designers to seek new methods of estimating the sight line motion. Current thinking is towards 'strapdown' methods, in which the angle measuring device (the seeker) is fixed to the missile body, and the gyros, also fixed to the body, perform the additional functions required in the missile autopilot, thus dispensing with the requirement for two sets of gyros in the missile.

According to the present invention a guidance processor for a homing missile having a strapdown seeker providing sight line look angle measurements with respect to missile body axes includes means for receiving sight line look angle measurements, means for transforming the look angle measurements from missile body axes to pseudo measurements in a further set of axes defined to force the pseudo measurements to be small.

Preferably the pseudo measurements are transformed, or approximated to be in inertial axes, defined such that the ordinate axis lies along the sight line, so that known navigation algorithms based on sight line spin may be used for homing guidance.

The axis transformation from missile body axes is preferably controlled by a rotation description from the body axis set to the further axis set based on measurements from body mounted transducers, for example rate gyros. Advantageously, the rotation description is further corrected by look angle estimates derived from the pseudo measurements by an extended Kalman filter. The filtered estimates may be used as look angle and sight line measurements for missile guidance.

Preferably axis transformation is performed by regularly updating matrix elements representing the transformation. This may be achieved by defining a quaternion representing the rotation describing the transformation required, a further quaternion being a derivative of the first, and a connection matrix to express the first quaternion in terms of the second and measurements of missile attitude from the body mounted transducers. The elements of the transformation matrix are preferably obtained by a continuous integration of the connecting equation.

Some examples and embodiments of the present invention will now be described with reference to the accompanying diagrammatic drawings of which:

To aid the understanding of those skilled in the art, the following background is presented.

Figure 1:
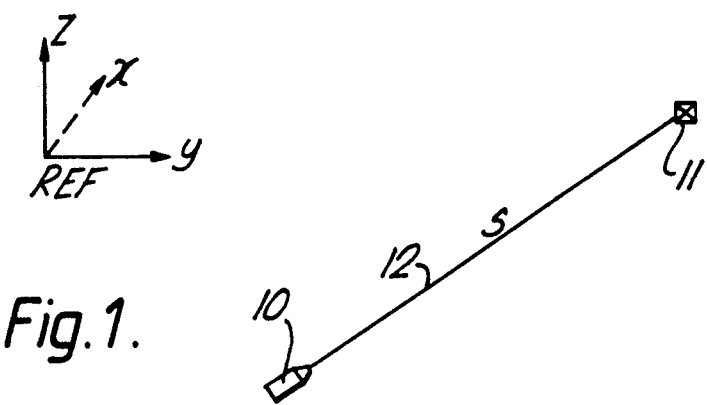
FIG. 1, FIG. 2 and FIG. 3 represent typical missile attack geometries.

Considering a homing missile 10 (FIG. 1) and its target 11 and their relationship in a space in which orthogonal axes (x, y, z) are defined, a line 12 drawn between the two bodies will be referred to as sight line, s. Due to the relative motion of the two bodies, the line s will, in general, change in length and in orientation in the 3D space as time passes. If the missile is on a collision course with the target and both are travelling at constant velocity then s will be shortening at a constant rate and its orientation in the x, y, z space will be constant, i.e. its angular spin rate in the space will be zero. If the missile is not on a collision course the sight line orientation will not be constant. Thus a simple guidance law might be to steer the missile to zero spin rate.

In the more general case where either the missile or target or both are travelling at non-constant velocity it can be shown that a particular programme or time history of sight line spin will cause a straight-flying missile to impact the target. Therefore, if the missile can be brought onto a straight line trajectory which yields the correct time variation of sight line spin in the non-constant velocity case, an impact will be guaranteed in the same way that zero sightline spin will guarantee impact in the constant velocity case. Many useful guidance laws based on sight line spin have been developed.

In the past a measure of sight line spin has been available from gyros placed on a dish decoupled from the missile body. However in the case of a missile employing strapdown sensors obtaining an estimate of sight line spin is not straight-forward.

Consider a missile which employs a body fixed homing sensor (seeker) such as an array of detector elements, a scanning detector element or line array of such elements, a TV camera, a simply gimballed detector element or array, or any other device which provides a measurement in some form of the angular orientation of the sight line with respect to the missile body, or some other local axes set. The problem is to establish the sight line spin in the x, y, z space (which will hereafter be referred to as the inertial frame) given the measurements from the body mounted seeker of the sight line to missile angles in the missile frame, or such other similar measurements as may be provided. The angles measured will hereafter be referred to as 'look angles'. In seeking a solution to the problem, account must be taken of the fact that the seeker introduces noise on the measurements.

Figure 2:
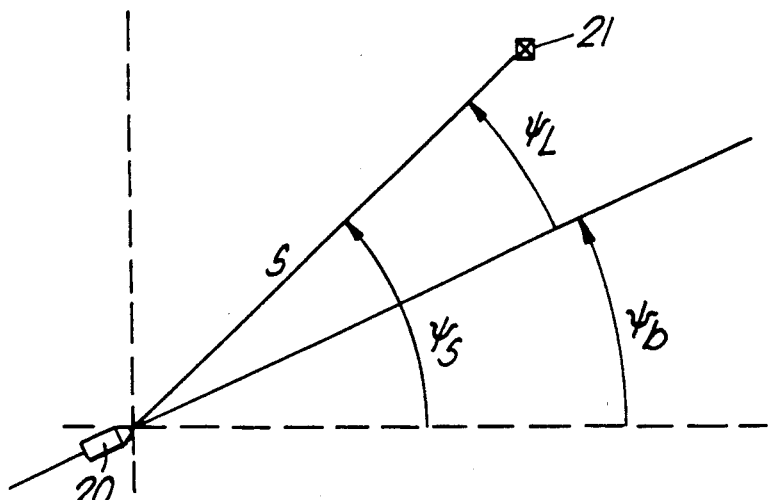

In order to develop the theoretical basis of the present invention it is convenient to consider the relatively simple, and well known, solution to the single plane or two dimensional case, in which the missile body and the sight line s from a missile 20 (FIG. 2) to target 21 both lie in a common plane.

The look angle $\psi_L$ measured by the seeker is:

$$\psi_L = \psi_s - \psi_b$$

where $\psi_s$ and $\psi_b$ are the sight line and body angles in an inertial frame. A solution to the sight line spin estimation problem in this case is straightforward. The measurements of look angle may be used to drive a Kalman filter, which contains an embedded model of the sight line spin dynamics. The missile body motion is measured by a strapdown rate gyro which provides an input to the Kalman filter dynamics model. Specifically, the system model is $$\frac{d}{dt}\begin{bmatrix} \psi_L \\ \omega_s \end{bmatrix} = \begin{bmatrix} 0 & 1 \\ 0 & -2\frac{\dot{r}}{r} \end{bmatrix}\begin{bmatrix} \psi_L \\ \omega_s \end{bmatrix} + \begin{bmatrix} -\omega_b \\ \frac{a_t - a_m}{r} \end{bmatrix} \quad (1)$$

where $\omega_s$ is the sight line spin rate, r the range, $\dot{r}$ the range rate, $\omega_b$ the missile body angular rate, and $a_t$ and $a_m$ the target and missile lateral accelerations normal to the sight line. Equation (1) can be expressed as $\dot{x} = Ax + u$, and the Kalman filter which generates an estimate $\hat{x}$ of the state vector $$\underline{x} = \begin{bmatrix} \psi_L \\ \omega_s \end{bmatrix}$$

is $$\dot{\hat{x}} = A\hat{x} + \underline{u} + K(z - H\hat{x}) \quad (2)$$

where $z = \psi_L + v_{noise}$ and $H = [1\ 0]$.

K is the Kalman gain matrix. This relatively simple scheme presupposes that the missile acceleration can be accurately measured and the target acceleration is known. Further, it assumes knowledge of the range r and range rate $\dot{r}$, and that the angular measurement sensitivities of the seeker and gyro are identical.

The soundness of this basic model will be apparent to those skilled in the art. It will be realised that simplifications or additions and refinements may be made to the basic scheme to take account of lack of knowledge about the measured quantities or alternative noise models added. For example, the target lateral acceleration can be estimated by including it in the state vector description. The range and range rate, or preferably inverse range and range rate divided by range, can, with certain restrictions, be estimated using non-linear extensions of the Kalman filtering technique such as the extended Kalman filter, and if the matching of the seeker and gyro scale factors is uncertain, it is also possible to include a scale factor as a state to be estimated.

It will be apparent that the underlying reason why the single-plane problem is soluble is that angular changes in a plane are simply additive, and so the relative angular motion of the sight line and the missile body can be described simply by adding the two component motions together. In the three-dimensional case, however, it is well known that angular changes are not simply additive. For example the sum of two rotations is, in general, dependent on the order in which the rotations occur. It turns out that the non-commutative nature of general three dimensional rotations makes the three dimensional sight line spin estimation problem impossible to solve by a direct method such as that described above for the two dimensional case. Even a description of the problem requires some rather advanced mathematics in matrix or quaternion calculus.

Successful missile guidance requires a solution to the sight line spin problem in three dimensions, such as that provided by the present invention. In order that the theoretical development of the invention may be further understood a description of the problem will now be presented.

Figure 3:
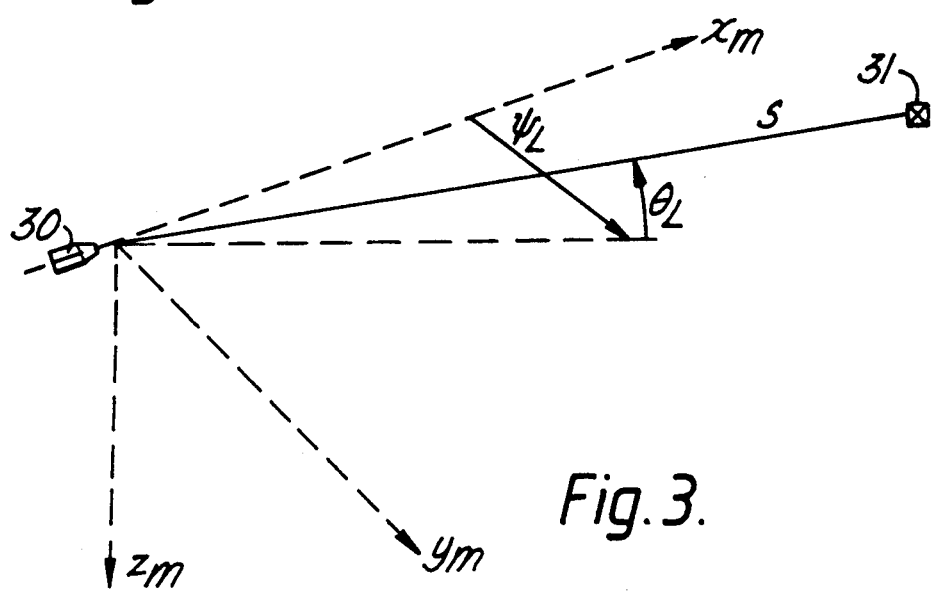

The orientation of a sight line s from missile 30 (FIG. 3) to target 31 with respect to missile axes $x_m$, $y_m$, $z_m$ is defined by two consecutive rotations $\psi_L$, $\theta_L$, which are in fact Euler angles. If a complete set of axes in the inertial space with s as their ordinate are defined in general a further rotational in roll, $\phi_L$, will be required to bring the missile axes into alignment with the sight line axes. The $\psi_L$, $\theta_L$, $\phi_L$ set is not unique; there are many other ways of describing the rotation but this set has been chosen because it is convenient to have a set which matches the measurements provided by the missile seeker. An array seeker, for example, could be configured to measure the angles $\psi_L$, $\theta_L$ (FIG. 3).

By defining the missile body axes by 'b' and the sight line axes by 's', the rotation from 'b' to 's' can be described by a rotation matrix L (the look matrix). Similarly the rotations from inertial to 'b' and inertial to 's' axes can be described by matrices B and S respectively. Then it can be shown that $$S = LB. \quad (3)$$

By differentiating equation (3) we can obtain the dynamics of the look matrix L in terms of the sight line spin rates in three axes, and the body rates in the missile axes. We obtain $$\dot{L} = \Omega_s L - L\Omega_b \quad (4)$$

where $\Omega_s$ and $\Omega_b$ are the two general three dimensional rates, of form $$\Omega = \begin{bmatrix} 0 & \omega_z & -\omega_y \\ -\omega_z & 0 & \omega_x \\ \omega_y & -\omega_x & 0 \end{bmatrix}. \quad (5)$$

If the dynamics of the sight line spins in $\Omega_s$ could be constructed an attempt could be made to set up a Kalman filter to estimate the spin rates, exactly as in the two dimensional case described above. However, the matrix L is a matrix of direction cosines, whilst the available measurements are of Euler angles. As a result, it is impossible to set up the estimator, except in the special case where the angles $\psi_L$, $\theta_L$, $\phi_L$ are small. In this case, the matrix L can be approximated by $$L = \begin{bmatrix} 1 & \psi_L & -\theta_L \\ -\psi_L & 1 & \phi_L \\ \theta & -\phi_L & 1 \end{bmatrix}. \quad (6)$$

This approximation is obtained by setting $\cos \psi_L$, $\cos \theta_L$, $\cos \phi_L = 1$, $\sin \psi_L \simeq \psi_L$, $\sin \theta_L \simeq \theta_L$, $\sin \phi_L \simeq \phi_L$, with $\psi_L \theta_L = 0$, etc. Having made this approximation, it is possible to set up an extended Kalman filter to estimate the sight line spins.

In general the look angles will not be small, and the approximations will not be valid. Therefore it is desirable that the look angles are forced to be small values. This can only be done directly by changing the method of guiding the missile. Such a change would lead to inadequate missile performance in most applications, and would have the unfortunate effect of making the considerable knowledge of guidance laws based on sight line spin redundant.

It will be appreciated that in accordance with the present invention the look angles are forced to be small by introducing an axis transformation as an indirect method to ensure equation 6 is valid.

The transformation will now be described in more detail.

Considering the general problem in which the look angles $\psi_L$, $\theta_L$, $\phi_L$ are large, in the present invention a further set of axes, the 'electronic', or 'e' axes, are set up within the guidance processor. These 'e' axes are rotated with respect to the missile body ('b') axes and are arranged to be in near alignment with the 's' axes. The initial setting for the 'b' to 'e' axes rotation is provided by the first seeker measurement pair (for example of $\psi_L$ and $\theta_L$). The initial closeness of the 'e' axes to the 's' axes will then depend on the noise on this first measurement. The look angle component $\phi_L$ may be set (arbitrarily) to zero. The method of describing the general rotation from 'b' to 'e' axes is not material to an understanding of the present invention; it could be described by three Euler angles $\psi_e$, $\theta_e$, 0, by a direction cosine rotation matrix E (body to electronic, i.e. 'e' to 'b' axes), or by a quaternion $q_b{}^e$.

Having set the general rotation 'b' to 'e', the rotation description is driven in response to missile body angular motion in such a way that the 'e' axes remain stationary in inertial space. This may be done by resolving the outputs of the missile strapdown gyros through the general rotation 'b' to 'e', and constructing the proper rate drive for the rotation description. If the missile gyros were perfect, the resultant inertial stabilisation of the 'e' axes would be, in principle, perfect. Therefore the 'e' axes would lie stationary in inertial space, and near to the 's' axes. Any imperfection in the rate gyros would result in some residual inertial motion of the 'e' axes which could be predicted from the particular gyro error, the missile body rates, and the 'b' to 'e' transformation.

The rotation from 'e' to 's' axes now has the desired property of being described by Euler angles which are small. The next step is to arrange for measurements of these small Eulers to be provided, with the objective of setting up an estimator for the sight line motion in inertial space. The seeker measurements are of course in the 'b' axes. Therefore the seeker measurements are transformed from 'b' to 'e' axes through the known 'b' to 'e' rotation, to obtain pseudo-measurements of the small Euler angles $\psi$, $\theta$ between the 'e' axes and the 's' axes. If the missile strapdown gyros are imperfect, the inertial rotational motion of the 'e' axes will lead to a third component, i.e. a $\phi$ component of look angle, between the 'e' and 's' axes. Were the gyros perfect, $\phi$ could be held near to zero by defining the sight line axes to be nonrolling, i.e. having zero angular rate in the x axis, i.e. $\omega_{sx} = 0$.

This definition of zero roll rate is arbitrary. The 's' axes may be defined to be rolling at any specified rate, but the choice of zero is a simple definition.

Thus measurement (or pseudo-measurement) of the small Eulers, $\psi$, $\theta$ has been achieved. The dynamics of these angles can be simply calculated using an equivalent to equation (4) above, because the small rotation from 'e' to 's' axes, which we can describe by a matrix $L_e$, has the form of equation (6). As the sight line rotates in inertial space, the small angles $\psi$, $\theta$ will evolve according to these known dynamics. Therefore an extended Kalman filter may be set up to estimate the sight line spin rates in inertial space. The Kalman filter will be driven by the pseudo-measurements of $\psi$ and $\theta$.

An alternative Kalman filter may be required if the gyros are imperfect. In particular, if the gyro scale factors are in error (a particularly damaging type of error which leads to missile control loop instability) then the inertial motion of the 'e' axes will contribute to the growth of $\psi$, $\theta$. The growth rates can be linked mathematically to the gyro scale factor errors, and the errors can therefore be estimated by the Kalman filter. Hence they may be corrected.

If the total angular motion of the sight line is large, the angles $\psi$, $\theta$, $\phi$ may become large enough for the approximation (6) for $L_e$ to fail. Therefore the estimates of these angles provided by the Kalman filter may be monitored, and the 'e' axes periodically rotated in such a way as to reduce the estimates to zero, thus preserving the approximation accuracy. If this updating of the 'e' axes is done at every processor update, the estimates of the angles $\psi$, $\theta$, $\phi$ are always zero following each correction, and a simplification of the Kalman filter equations results.

It will be appreciated that the 'e' axes may be regarded as in some ways mathematically equivalent to the dish axes in a gimballed dish seeker. However their stabilisation in inertial space is achieved by driving them from the resolved outputs of the body mounted gyros, rather than observing their inertial motion directly by placing gyros on them, as in the preferred classical solution.

It will further be appreciated that the mechanical complexity of the classical solution has been replaced by the signal processing complexity of a modern mathematical, strapdown solution. It is anticipated that the growth of microprocessor technology will lead to very cheap, special purpose chips which would perform each of the special functions outlined in the invention. A common chip set would solve the strapdown homing guidance problem for all homing missiles, whatever form of homing sensor they employed.

For example, consider the application to a semi-strapdown radar seeker employing a reflector plate, a preferred mechanisation at the present time because it allows very large look angles to be obtained in a small volume seeker. In this case the classical solution cannot be employed because the reflector plate does not move at the radar beam rate. The attitude of the reflector plate with respect to the missile body, which can be very accurately measured, controls the angular position of the radar beam centre with respect to the body. Because of the special nature of the reflection rotation at the reflector plate we can construct the rotation matrix $R_b^{beam}$ from the reflector plate position data. The output of the seeker establishes the measurements of two of the Euler angles in the matrix $L_{beam}^s$. Knowing the rotation from 'b' to 'e' axes, matrices $L_e$ and $L_e^s$ can be constructed:

$$L_e = L_e^s = L_{beam}^s R_b^{beam} R_e^b. \quad (7)$$

This relationship may be used to construct measurements of the small Euler angles $\psi$, $\theta$, and hence set up the sightline spin estimator. In order that features and advantages of the present invention may be further understood, a specific embodiment will now be considered by way of further example. In a missile guidance processor illustrated in FIG. 4, signals 41 are received from a strapdown body mounted seeker 42, containing information about look angles to target. As the seeker is strapdown, these measurements will be in the missile body axes 'b'. Within the processor a transform 43 is performed from 'b' axes to 'e' axes as previously described to provide pseudo-measurements 44 in the axis set.

It will be apparent that as the look angle information 41 is measured in the 'b' axes, a knowledge of missile body movement is necessary to perform the 'b' to 'e' axis transformation 43. This is obtained from body mounted rate gyros 45 which provide outputs 46 which, following correction 47, and transformation 48 to the 'e' axes provide a rate drive 49 to control 400 for transformation operations 43 and 48.

Having established pseudo-measurements in the 'e' axes, the axes themselves must be stabilized in inertial space so that they lie close to the 's' axis, such that the approximations to validate equation (6) above may be applied. To this end a rate drive 49 from the gyros is employed, and an extended Kalman filter 401 is used to provide optimal estimates of the look angles in the 'e' axes, principally to correct transformation control 400, but which may also influence gyro correction 47 by means of instrument error estimates 403.

As will be described in more detail below, Kalman filter 401 may be set up to provide estimates of look angles 402 and sight line spins 404 which may be fed as data signals to a conventional missile navigator 405 (together with corrected gyro signals 47 and signals from body mounted accelerometers 406) for missile control via actuators 407. Laws for missile guidance which may be implemented in navigator 405 in response to the input data, for example proportional navigation, will be apparent to those skilled in the art.

It will be appreciated that in the operation of the present invention it is necessary to drive the transform operations 43 and 48 correctly and this operation is dependent upon firstly having a reliable model of the dynamic situation embedded in the extended Kalman filter 401 so that reliable estimates of look angles may be derived and secondly choosing appropriate initial conditions both for the estimates and the transform operations themselves. The operation of these components will now be considered in more detail.

In a missile having a strapdown seeker, measurements of the $\psi$, $\theta$ Euler look angles (i.e. $\psi_2$, $\theta_L$ (FIG. 3) are available. Defining a transformation E from 'b' to 'e' axes (43) and letting the transformation from 'e' to 's' axes be $L_e$, if the 'e' axes are close to the 's' axes then the Euler angles of $L_e$ will be small. If L is defined as the transformation from 'b' to 's' axes, so that $\psi_L$, $\theta_L$ are two of the Euler angles of L, then $$L = L_e E$$

and so $$L_e = L E^T. \quad (8)$$

Now the first row of L is $$L(\text{row } 1) = [\cos \psi_L \cos \theta_L | \sin \psi_L \cos \theta_L | -\sin \theta_L] \quad (9)$$

and so an expression may be obtained for the $\psi$, $\theta$ Eulers of $L_e$, i.e.

$$-\sin \theta = L(\text{row } 1) E^T(\text{col } 3) \quad (10)$$
$$= L(\text{row } 1) (E(\text{row } 3))^T \quad \text{and}$$

$$\sin \psi \cos \theta = L(\text{row } 1) E^T(\text{col } 2) \quad (11)$$
$$= L(\text{row } 1) (E(\text{row } 2))^T$$

Figure 4:
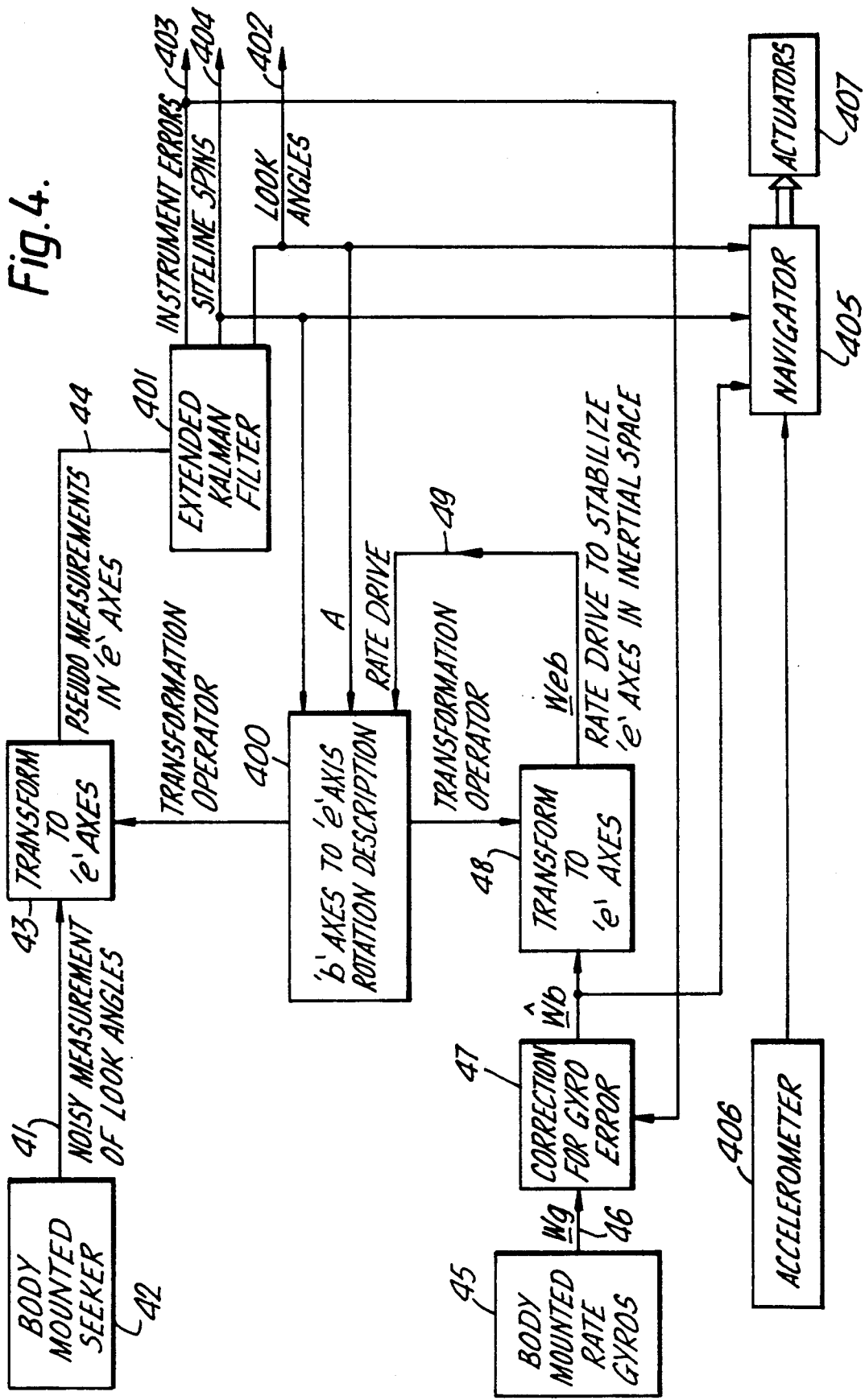
FIG. 4 represents a block diagram of an embodiment of the present invention.

From equations (10) and (11) the pseudo-measurements of $\psi$ and $\theta$ may be computed given the measurements of $\psi_L$ and $\theta_L$. This operation is transform 43 (FIG. 4).

Transform operators are controlled by the rotation description E from 'b' to 'e' axes (400). Given that S is a transformation from inertial to 's' axes, and B a transformation from inertial to 'b' axes, then $$S = L_e E B \quad (12)$$

By differentiating this equation $$\dot{L}_e = \Omega_{si} L_e - L_e (E \Omega_{bi} E^T + \Omega_{eb}) \quad (13)$$

where $\Omega_{si}$ is the general rotation rate matrix for the sight line with respect to inertial space, $\Omega_{bi}$ is the rotation rate matrix for the 'b' axes, and $\Omega_{eb}$ is the rotation rate of the 'e' axes with respect to the 'b' axes.

Considering the sight line to be stationary in inertial space, then $\Omega_{si} = 0$ in (13) and it is clear that to hold the 'e' axes steady in inertial space so that $\dot{L}_e = 0$, the rate drive $\Omega_{eb}$ should be $$\Omega_{eb} = -E \Omega_{bi} E^T. \quad (14)$$

Now it can be shown that if the body angular rates are assembled as a vector, $$\underline{\omega}_b = \begin{bmatrix} \omega_{bx} \\ \omega_{by} \\ \omega_{bz} \end{bmatrix},$$

then (14) can be replaced by the vector equivalent $$\underline{\omega}_{eb} = E \underline{\omega}_b. \quad (15)$$

The components of $\underline{\omega}_{eb}$ are the required rate drives (48) for the E transformation.

A convenient method of representing the rotation whose transformation matrix is E is by a quaternion, $q_b^e$. It can be shown that the rate of change of the quaternion due to the rate drive $\underline{\omega}_{eb}$ is $$\dot{q}_b^e = \Omega_{eb} q_b^e \tag{16}$$

where $\Omega_{eb}$ is a 4×4 skew symmetric matrix in the elements of $\underline{\omega}_{eb}$, $$\Omega_{eb} = \tfrac{1}{2}\begin{bmatrix} 0 & -\omega_{ebx} & -\omega_{eby} & -\omega_{ebz} \\ \omega_{ebx} & 0 & \omega_{ebz} & -\omega_{eby} \\ \omega_{eby} & -\omega_{ebz} & 0 & \omega_{ebx} \\ \omega_{ebz} & \omega_{eby} & -\omega_{ebz} & 0 \end{bmatrix}. \tag{17}$$

Continuous integration of (16) provides a continuous value for the quaternion $q_b^e$. It can also be shown that a discrete-time transition matrix solution to (16) exists.

The matrix E may now be constructed from the elements of the quaternion $q_b^e$ using the well known mathematical relationship between a rotation matrix and the quaternion for the rotation.

The matrix E must be initialised from the first pair of measurements of $\psi_L$, $\theta_L$. It can be shown that the quaternion for a rotation through two Euler angles $\psi$, $\theta$ is $$q = \begin{bmatrix} \cos\tfrac{\psi}{2}\cos\tfrac{\theta}{2} \\ -\sin\tfrac{\psi}{2}\sin\tfrac{\theta}{2} \\ \cos\tfrac{\psi}{2}\sin\tfrac{\theta}{2} \\ \sin\tfrac{\psi}{2}\cos\tfrac{\theta}{2} \end{bmatrix}. \tag{18}$$

Hence the initial value of the quaternion $q_b^e$, given the measurements $Z_1$ of $\psi_L$, and $Z_2$ of $\theta_L$, is $$q_b^e = \begin{bmatrix} \cos\tfrac{Z_1}{2}\cos\tfrac{Z_2}{2} \\ -\sin\tfrac{Z_1}{2}\sin\tfrac{Z_2}{2} \\ \cos\tfrac{Z_1}{2}\sin\tfrac{Z_2}{2} \\ \sin\tfrac{Z_1}{2}\cos\tfrac{Z_2}{2} \end{bmatrix}. \tag{19}$$

Having established the means for setting up and stabilising the 'e' axes, and obtaining the pseudo-measurements of $\psi$ and $\theta$ for the extended Kalman filter (401) the design of the Kalman filter itself will be considered. Using equation (13), it can be shown that the rate of change of the three small Euler angles for $L_e$ is given approximately by $$\dot{\underline{\gamma}} \simeq A_1 \underline{\omega}_s - A_2(E\underline{\omega}_b + \underline{\omega}_{eb}) \tag{20}$$

where $$\underline{\gamma} = \begin{bmatrix} \psi \\ \theta \\ \phi \end{bmatrix}$$

and $A_1$, $A_2$ are matrix functions of $\psi$, $\theta$, $\phi$ $$A_1 = \begin{bmatrix} 1 & 0 & \theta \\ 0 & 1 & -\phi \\ 0 & \phi & 1 \end{bmatrix}, \tag{21}$$

$$A_2 = \begin{bmatrix} 1 & \psi & 0 \\ -\psi & 1 & 0 \\ \theta & 0 & 1 \end{bmatrix}.$$

The smaller $\underline{\gamma}$ becomes, the better is the approximation (20).

Hence between measurements provided by the seeker, the estimates of $\psi, \theta, \phi$ should obey the equation $$\dot{\hat{\underline{\gamma}}} = \hat{A}_1 \hat{\underline{\omega}}_s - \hat{A}_2(E\hat{\underline{\omega}}_b + \underline{\omega}_{eb}). \tag{22}$$

However, by previous arguments, $\underline{\omega}_{eb}$ may be set $$\underline{\omega}_{eb} = -E\hat{\underline{\omega}},$$

and so the dynamics of the estimates become $$\dot{\hat{\underline{\gamma}}} = \hat{A}_1 \hat{\underline{\omega}}_s \tag{23}$$

where $\hat{\underline{\omega}}_s$ is the best estimate of the sight line spin rate vector. Using (23) to update the small Euler angle estimates between seeker measurements, the dynamics of the sight line spin $\underline{\omega}_s$ can be shown to be $$\frac{d}{dt}\begin{bmatrix} \omega_{sy} \\ \omega_{sz} \end{bmatrix} = -2\frac{\dot{r}}{r}\begin{bmatrix} 1 & 0 \\ 0 & 1 \end{bmatrix}\begin{bmatrix} \omega_{sy} \\ \omega_{sz} \end{bmatrix} + \frac{1}{r}\begin{bmatrix} -a_{sz} \\ a_{sy} \end{bmatrix} \tag{24}$$

where r is missile-target range, $\dot{r}$ is the range rate, and $a_{sy}$, $a_{sz}$ are the relative target-missile accelerations normal to the sight line. Depending on the knowledge within the system of these various quantities, various near-optimal and sub-optimal choices of the manner in which to propagate $\hat{\omega}_s$ between measurements are available. The choice must depend on this knowledge, and the effectiveness of the filter in providing accurate estimates of $\underline{\omega}_s$ will depend on it. For the purposes of this embodiment it is assumed that r, $\dot{r}$, and the missile acceleration are all known, and that the target acceleration can be approximated to zero. Then by resolving the missile acceleration vector from 'b' to 'e' axes, using the matrix E, the equation for updating the estimate $\hat{\underline{\omega}}_s$ between measurements becomes $$\frac{d}{dt}\begin{bmatrix} \hat{\omega}_{sy} \\ \hat{\omega}_{sz} \end{bmatrix} = -2\frac{\dot{r}}{r}\begin{bmatrix} 1 & 0 \\ 0 & 1 \end{bmatrix}\begin{bmatrix} \omega_{sy} \\ \hat{\omega}_{sz} \end{bmatrix} + \frac{1}{r}\begin{bmatrix} -a_{ez} \\ a_{ey} \end{bmatrix}. \tag{25}$$

Provided the 'e' axes are in fact close to the 's' axes, this approximation will be satisfactory.

To update the error covariance for the states $\phi, \theta, \psi$, $\omega_{sy}$, $\omega_{sz}$ in the interval between measurements and considering the states $\phi$, $\theta$, $\psi$, it can be shown using equations (20) and (22) that $$\frac{d}{dt}(\tilde{\underline{\gamma}}) \triangleq \tilde{A}_1 \underline{\omega}_s + \hat{A}_1 \tilde{\underline{\omega}}_s - \hat{A}_2 E \tilde{\underline{\omega}}_b. \tag{26}$$

where $\tilde{x}$ is the error in the estimate $\hat{\underline{x}}$ of $\underline{x}$, i.e.

$$\hat{\underline{x}} = \underline{x} + \underline{\tilde{x}} \tag{27}$$

The error in the body rate estimate can be linked to the gyro scale factor estimation errors $\tilde{K}_x$, $\tilde{K}_y$, $\tilde{K}_z$; it can be shown that $$\omega_b = - \begin{bmatrix} \hat{\omega}_{bx} \tilde{K}_x \\ \hat{\omega}_{by} \tilde{K}_y \\ \hat{\omega}_{bz} \tilde{K}_z \end{bmatrix}. \tag{28}$$

Finally, the sight line spin estimation error dynamics can be obtained from (24) and (25) as $$\frac{d}{dt}(\tilde{\omega}_{sy}) \approx -\frac{a_{ey}}{r}\tilde{\phi} + \frac{a_{ex}}{r}\tilde{\theta} - 2\frac{\dot{r}}{r}\tilde{\omega}_{sy}$$

$$\frac{d}{dt}(\tilde{\omega}_{sz}) \approx -\frac{a_{ez}}{r}\tilde{\phi} + \frac{a_{ex}}{r}\tilde{\psi} - 2\frac{\dot{r}}{r}\tilde{\omega}_{sz} \tag{29}$$

Using these error rate equations, the error dynamics matrix may be constructed, and hence it is possible to propagate the error covariance matrix between measurements, using either the matrix Ricatti equations, or a transition matrix method. If the second method is used, we must bear in mind that the error dynamics is a function of the state, which may vary considerably between the measurements. Whichever method is employed, it will be appreciated that a continuous-discrete formulation in the Kalman filter may be achieved.

The dynamics of the gyro scale factor errors in this embodiment is taken to be zero, i.e. the scale factor errors are assumed constant with time. Thus the state vector to be estimated by the Kalman filter is $$\underline{x} = [\phi \ \theta \ \psi \ \omega_{sy} \ \omega_{sz} \ K_x \ K_y \ K_z]^T.$$

Considering the Kalman filter measurement update, since the measurements, or more precisely the pseudo-measurements, are linear in $\psi$, $\theta$ the measurements update equations are simple; they are the well known ones employed in the linear Kalman filter algorithm. The Kalman gain matrix is computed in the usual way and a measurement residual is computed by subtracting the measurement predictions (obtained from the state estimates) from the pseudo-measurements. A vector of corrections to the estimated states is then obtained by multiplying the Kalman gain matrix and the measurement residual vector. These corrections are simply added to the state estimates. The gyro outputs 46 are corrected (47) using $$\hat{\omega}_{bx} = \frac{\omega_{gx}}{1 + \hat{K}_x} \tag{30}$$

and similarly for the y and z gyro outputs.

In alternative embodiments simplifying refinements are possible. First, the observability of the non-measured Euler angle of $\phi$ is very low. Since it is unlikely that the Kalman filter corrections to this state will be significant, there is no point in estimating it. Therefore it can be dropped from the state description. The state vector to be corrected at the measurement update becomes $$\underline{x} = [\theta \ \psi \ \omega_{sy} \ \omega_{sz} \ K_x \ K_y \ K_z]^T \tag{31}$$

with a corresponding reduction in computing load.

Second, the feedback path A (FIG. 4) allows the quaternion description for the 'e' axes to be updated by the estimates of the small Eulers $\psi$, $\theta$, $\phi$ (or $\psi$, $\theta$ in the reduced state filter). It can be shown that the correction to the $q_b^e$ quaternion is given by $$\delta q_b^e = \frac{1}{2} \begin{bmatrix} -q_3 & -q_2 & -q_1 \\ q_2 & -q_3 & q_0 \\ -q_1 & q_0 & q_3 \\ q_0 & q_1 & -q_2 \end{bmatrix} \begin{bmatrix} \hat{\psi} \\ \hat{\theta} \\ \hat{\phi} \end{bmatrix}. \tag{32}$$

If this correction is applied at each measurement update, or more frequently, then the estimates of the small Eulers $\phi$, $\theta$, $\psi$ become zero by definition immediately following the correction. As a result the dynamics equations for the estimated state and the estimation error simplify, with a corresponding reduction in computing load.

I claim:

1. In a homing missile having a strapdown seeker providing sight line look angle measurements with respect to missile body axes, a guidance processor including means for receiving sight line look angle measurements, and transformation means for transforming the look angle measurements from missile body axes to pseudo measurements in a further set of axes defined to force the pseudo measurements to be small.

2. A guidance processor as in claim 1 wherein said pseudo measurements are transformed to inertial axes defined such that the ordinate axis lies along the sight line.

3. A guidance processor as in claim 1 further including means for regularly updating matrix elements representing transformations whereby said axis transformation is carried out.

4. In a homing missile having a strapdown seeker providing sight line look angle measurements with respect to missile body axes and a plurality of rate gyros for providing a rate drive for axis transformation, a guidance processor including means for receiving sight line look angle measurements, and transformation means for transforming in response to outputs from said gyros the look angle measurements from missile body axes to pseudo measurements in a further set of axes defined to force the pseudo measurements to be small.

5. A guidance processor as in claim 4 including an extended Kalman filter, wherein a rotation description of the body axis set is further corrected by look angle estimates derived from the pseudo measurements.

6. A guidance processor as in claim 4 further including means for regularly updating matrix elements representing transformations and wherein axis transformation is carried out by defining a first quaternion representing a rotation describing the transformation required and a second quaternion which is a derivative of the first, and wherein a connection matrix is used to express the first quaternion in terms of the second quaternion and measurements of the missile attitude from said rate gyros.

* * * * *